United States Patent
Mundhenk et al.

(10) Patent No.: US 9,761,002 B2
(45) Date of Patent: Sep. 12, 2017

(54) STEREO-MOTION METHOD OF THREE-DIMENSIONAL (3-D) STRUCTURE INFORMATION EXTRACTION FROM A VIDEO FOR FUSION WITH 3-D POINT CLOUD DATA

(71) Applicant: The Boeing Company, Chicago, IL (US)

(72) Inventors: Terrell Nathan Mundhenk, Calabasas, CA (US); Hai-Wen Chen, Aberdeen, MD (US); Yuri Owechko, Newbury Park, CA (US); Dmitriy Korchev, Irvine, CA (US); Kyungnam Kim, Oak Park, CA (US); Zhiqi Zhang, Merritt Island, FL (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 13/953,758

(22) Filed: Jul. 30, 2013

(65) Prior Publication Data
US 2015/0036916 A1 Feb. 5, 2015

(51) Int. Cl.
*G06T 7/00* (2017.01)
*G06T 7/593* (2017.01)

(52) U.S. Cl.
CPC ............ *G06T 7/0075* (2013.01); *G06T 7/593* (2017.01); *G06T 2207/10012* (2013.01); *G06T 2207/10032* (2013.01); *G06T 2207/30181* (2013.01)

(58) Field of Classification Search
None
See application file for complete search history.

(56) References Cited

U.S. PATENT DOCUMENTS

| | | |
|---|---|---|
| 6,854,104 B2 * | 2/2005 | Aleshin et al. ............... 716/53 |
| 8,463,459 B2 | 6/2013 | Breshears |
| 8,498,489 B2 * | 7/2013 | Abe .................. G06K 9/6203 348/125 |
| 9,235,922 B2 * | 1/2016 | Alj ...................... G06T 15/08 |
| 2012/0243775 A1 * | 9/2012 | Ma et al. ................... 382/154 |

(Continued)

OTHER PUBLICATIONS

Extended European Search Report EP14178716.8 mailed Jan. 7, 2015.

(Continued)

*Primary Examiner* — Sumati Lefkowitz
*Assistant Examiner* — Jiangeng Sun
(74) *Attorney, Agent, or Firm* — McDonnell Boehnen Hulbert & Berghoff LLP

(57) ABSTRACT

According to an embodiment, a method for generating a 3-D stereo structure comprises registering and rectifying a first image frame and a second image frame by local correction matching, extracting a first scan line from the first image frame, extracting a second scan line from the second image frame corresponding to the first scan line, calculating a pixel distance between the first scan line and the second scan line for each pixel for a plurality of pixel shifts, calculating a smoothed pixel distance for each pixel for the pixel shifts by filtering the pixel distance for each pixel over the pixel shifts, and determining a scaled height for each pixel of the first scan line, the scaled height comprising a pixel shift from among the pixel shifts corresponding to a minimal distance of the smoothed pixel distance for the pixel.

20 Claims, 8 Drawing Sheets

(56) References Cited

U.S. PATENT DOCUMENTS

| | | | |
|---|---|---|---|
| 2012/0249747 A1* | 10/2012 | Aviv et al. | 348/47 |
| 2013/0057644 A1* | 3/2013 | Stefanoski | G06T 5/50 348/42 |
| 2013/0177237 A1* | 7/2013 | Schamp | G06K 9/00805 382/154 |

OTHER PUBLICATIONS

Lazaros Nalpantidis, Georgios Ch. Sirakoulis, and Antonios Gasteratos "A Dense Stereo Correspondence Algorithm for Hardware Implementation with Enhanced Disparity Selection", SETN 2008, LNAI 5138, pp. 365-370, Springer-Verlag Berlin Heidelberg 2008.

Stephen Se and Nick Pears, "Passive 3D Imaging", Chapter 2, 3D Imaging, Analysis and Applications, DOI 10.1007/978-1-4471-4063-4_2, Springer-Verlag London 2012.

Huber, M., Schickle, W., Him, S., & Baumgartne, A. (2003). Fusion of LIDAR dam and aerial imagery for automatic reconstruction of building surfaces. Paper presented at the GRSS/ISPRS Joint Workshop on Remote Sensing and Data Fusion over Urban Areas, Wessling, Gennany.

Lee, D. H., Lee, K. M., & Lee, S. U. (2008). Fusion of Lidar and Imagery for Reliable Building Extraction. Phntogrammetric Engineering & Remote Sensing, 74(2), 215-225.

Mastin, A., Kepner, 1., & Fisher, J. (2009). Automatic Registration of LIDAR and Optical Images of Urban Scenes. Paper presented at the CVPR, Miami Beach, Florida.

Moreno-Noguer, F., Lepetit, V., & Fua, P. (2007). Accurate Nun-Iterative O(n) Solution I0 the PnP Problem.Paper presented at the IEEE International Conference on Computer Vision (ICCV), Rio de Janeiro, Brazil.

Salah, M., Trinder, J., Shaker, A., I-lamed, M., & Elsagheer, A. (2009). Aerial Images and LIDAR Data Fusion for Automatic Feature Extraction Using the Self-Organizing Map (SOM) Classifier. In F. Bretar, M. Pienot-Deseilligny & G. Vosselman (Eds), Laser scanning (vol. XXXVIII). Paris: IAPRS.

Schenk, T., & Csatho, B. (2002). Fusion of LIDAR Data and Aerial Imagery for a More Complete Surface Description Paper presented at the ISPRS, Graz, Austria.

S. Birchfield and C. Tomasi. 'Depth discontinuities by pixel-to-pixel stereo,' International Journal of Computer Vision 35(3), 269-293 (1999).

Soille, P. (1999). Morphological Image Analysis: Principles and Applications (pp. 170-171): Springer-Verlag.

Wikimedia Foundation, "Image Rectification", Jan. 15, 2013, available via the Internet at en.wikipedia.org/w/index.php?title=Image_rectification&oldid=533157155 (last visited Dec. 10, 2016).

\* cited by examiner ably along scan lines according to an embodiment of the disclosure.
STEREO-MOTION METHOD OF THREE-DIMENSIONAL (3-D) STRUCTURE INFORMATION EXTRACTION FROM A VIDEO FOR FUSION WITH 3-D POINT CLOUD DATA

FIELD

Embodiments of the disclosure relate generally to viewing systems and methods. More particularly, embodiments of the disclosure relate to systems and methods for extracting three-dimensional (3-D) stereo structure information from two-dimensional (2-D) electro-optical (EO) images.

BACKGROUND

In computer vision, Structure From Motion (SFM) refers to a process of finding a 3-D structure of objects by analyzing local motion signals over time. Most traditional registration methods can be extremely slow given a large electro-optical image size.

SUMMARY

Systems and methods for generating a three-dimensional (3-D) stereo structure are presented. According to an embodiment, a method for generating a 3-D stereo structure comprises registering and rectifying a first image frame and a second image frame by local correction matching, extracting a first scan line from the first image frame, extracting a second scan line from the second image frame corresponding to the first scan line, calculating a pixel distance between the first scan line and the second scan line for each pixel for a plurality of pixel shifts, calculating a smoothed pixel distance for each pixel for the pixel shifts by filtering the pixel distance for each pixel over the pixel shifts, and determining a scaled height for each pixel of the first scan line, the scaled height comprising a pixel shift from among the pixel shifts corresponding to a minimal distance of the smoothed pixel distance for the pixel.

According to another embodiment, a system for three-dimensional (3-D) structure information extraction from video for fusion with 3-D point cloud comprises a registration and rectification module configured to register and rectify a first image frame and a second image frame by local correction matching, a scan-line module configured to extract a first scan line from the first image frame, and extract a second scan line from the second image frame corresponding to the first scan line, and a minimum absolute difference module configured to calculate a pixel distance between the first scan line and the second scan line for each pixel for a plurality of pixel shifts, calculate a smoothed pixel distance for each pixel for the pixel shifts by filtering the pixel distance for each pixel over the pixel shifts, and determine a scaled height for each pixel of the first scan line, the scaled height comprising a pixel shift from among the pixel shifts corresponding to a minimal distance of the smoothed pixel distance for the pixel.

According to a further embodiment, a non-transitory computer readable storage medium comprises computer-executable instructions for three-dimensional (3-D) structure information extraction from video for fusion with a 3-D point cloud, the computer-executable instructions comprising registering and rectifying a first image frame and a second image frame by local correction matching, extracting a first scan line from the first image frame, extracting a second scan line from the second image frame corresponding to the first scan line, calculating a pixel distance between the first scan line and the second scan line for each pixel for a plurality of pixel shifts, calculating a smoothed pixel distance for each pixel for the pixel shifts by filtering the pixel distance for each pixel over the pixel shifts, and determining a scaled height for each pixel of the first scan line, the scaled height comprising a pixel shift from among the pixel shifts corresponding to a minimal distance of the smoothed pixel distance for the pixel.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figures 1, 2:
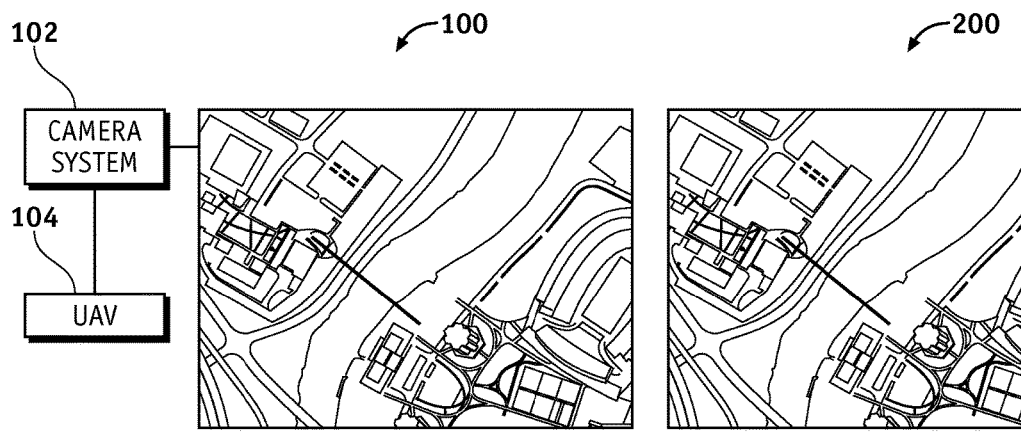
FIG. 1 and FIG. 2 are illustrations of Full Motion Video (FMV) Electro-Optical (EO) images taken by a camera system of a same fast moving unmanned aerial vehicle (UAV) at different times according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to two-dimensional (2-D) and three-dimensional (3-D) imaging systems, imaging techniques, computing camera location, and other functional aspects of the systems (and the individual operating components of the systems) may not be described in detail herein. In addition, those skilled in the art will appreciate that embodiments of the disclosure may be practiced in conjunction with a variety of hardware and software, and that the embodiments described herein are merely example embodiments of the disclosure.

Embodiments of the disclosure are described herein in the context of a practical non-limiting application, namely, landscape imaging. Embodiments of the disclosure, however, are not limited to such applications, and the techniques described herein may also be utilized in other applications. For example but without limitation, embodiments may be applicable to combat information centers, underwater navigation, construction, mining and petroleum engineering, electronic games, scientific visualization, user interfaces, interacting with architectural models, computed aided drafting systems, or any environment represented as a three-dimensional model, and the like. Moreover, embodiments of the disclosure are applicable to, for example but without limitation, navigating through virtual training facilities comprising ground terrain, buildings, foliage, and other physical structures.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the disclosure.

Configurations of the disclosure construct a reliable 3-D structure from a Full Motion Video (FMV) sequence. The 3-D model obtained from this structure-from-motion process can be combined with a 3-D point cloud of light detection and ranging (LIDAR) data using 3-D-to-3-D registration in order to perform sensor fusion of 3-D and FMV data.

FIG. 1 and FIG. 2 are illustrations of electro-optical (EO) images 100 and 200 taken by a camera system 102 of a same fast moving unmanned aerial vehicle (UAV) 104 at different times according to an embodiment of the disclosure. EO images may also be captured using a manned aerial vehicle such as, but without limitation, a private or commercial aircraft fitted with a suitable camera system 102. EO images 100 and 200 are referred to as Full Motion Video (FMV) EO images herein. These FMV EO images 100 and 200 are input data (images) for a system 400 (FIG. 4) described below according to an embodiment the disclosure. A stereo structure 300 (FIG. 3) is generated from the two input FMV EO images 100 and 200.

Figure 3:
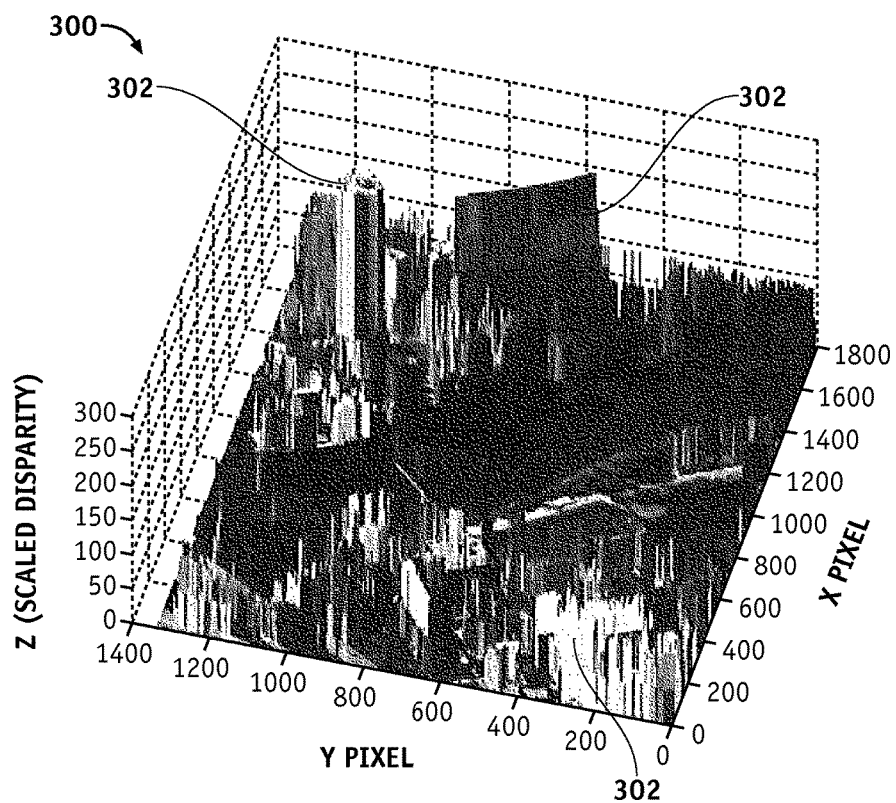
FIG. 3 is an illustration of a stereo structure generated using the FMV EO images of FIG. 1 and FIG. 2 according to an embodiment of the disclosure.

FIG. 3 is an illustration of the stereo structure 300 (virtual view 300) generated as an output image of the system 400 according to an embodiment of the disclosure. Structure-of buildings 302 in the stereo structure 300 is shown in FIG. 3. Thus, the system 400 creates the virtual view 300 from sides of the buildings 302 extrapolated from overhead imageries such as the FMV EO images 100 and 200. The virtual view 300 is a stereo disparity (stereo height) of each pixel created from the two input FMV EO images 100 and 200 in FIGS. 1 and 2. In this manner, embodiments provide Structure From Motion (SFM) for the FMV EO images 100 and 200.

In order to generate the 3-D structures, a variety of different technologies can be applied such as, without limitation, LIDAR, stereo cameras, or other method. Combining FMV images with the corresponding 3-D LIDAR data is very useful for understanding complex scenes (such as for contextual target detection and tracking) and to perform effective missions (such as collision free navigation and route planning). Synchronizing the 3-D LIDAR data with the 2-D EO data may not be trivial; therefore, some extra efforts may be needed to obtain the 2-D and 3-D fusion information. Therefore, embodiments introduce a way to extract a point cloud taken by the camera system 102 loaded on the UAV 104 at different times without calibration. Although, many researchers have been working on this structure from motion problem standpoint, embodiments provide a new method to handle FMV EO images with low computational requirements. A local correlation matching technique is applied to highly speed up generating the stereo structure 300 as explained in more detail below.

SFM is a popular topic in computer vision, and refers to a process of finding a three-dimensional structure of an object by analyzing local motion signals over time. Although in the literature many kinds of technologies have been investigated, adapted and created to achieve SFM, most focus on EO images that are taken by a normal ground camera. However, the system 400 handles noisier and larger FMV EO images. As illustrated in FIGS. 1-2 the input data of system 400 is two FMV EO images 100 and 200 at different times substantially without calibration, registration or rectification.

The FMV EO images 100 and 200 are much noisier than the normal ground camera images, and most of the traditional methods for stereo disparity extraction may not work for the FMV EO images 100, 200. Also, FMV EO images 100 and 200 are usually very large (e.g., >=4000×2000). Therefore, most of the traditional registration methods using template correlation methods are too slow to be adapted in these applications. Embodiments provide a system and method to process noisy FMV EO images 100 and 200 and resolves the above issues.

In some embodiments system 400 performs the following:

1) Rectifies the two input images 100 and 200 by matching points between these two FMV EO images 100 and 100. In this manner, a local correlation matching technique using sub-pixel registration is used instead of the traditional global correlation match methods which are too slow for EO images of large size (e.g., UAV videos of 4000×2000 resolution) for most applications.

2) Generates a stereo disparity of each pixel from the two input FMV EO images 100 and 200. In this manner, instead of using a single pixel comparison method, a minimum absolute difference (MAD) method compares multiple pixels since aerial FMV EO images 100 and 200 that are much noisier than ground stereo camera images, and the single pixel comparison may not work for the noisy FMV EO images 100 and 200.

Figure 4:
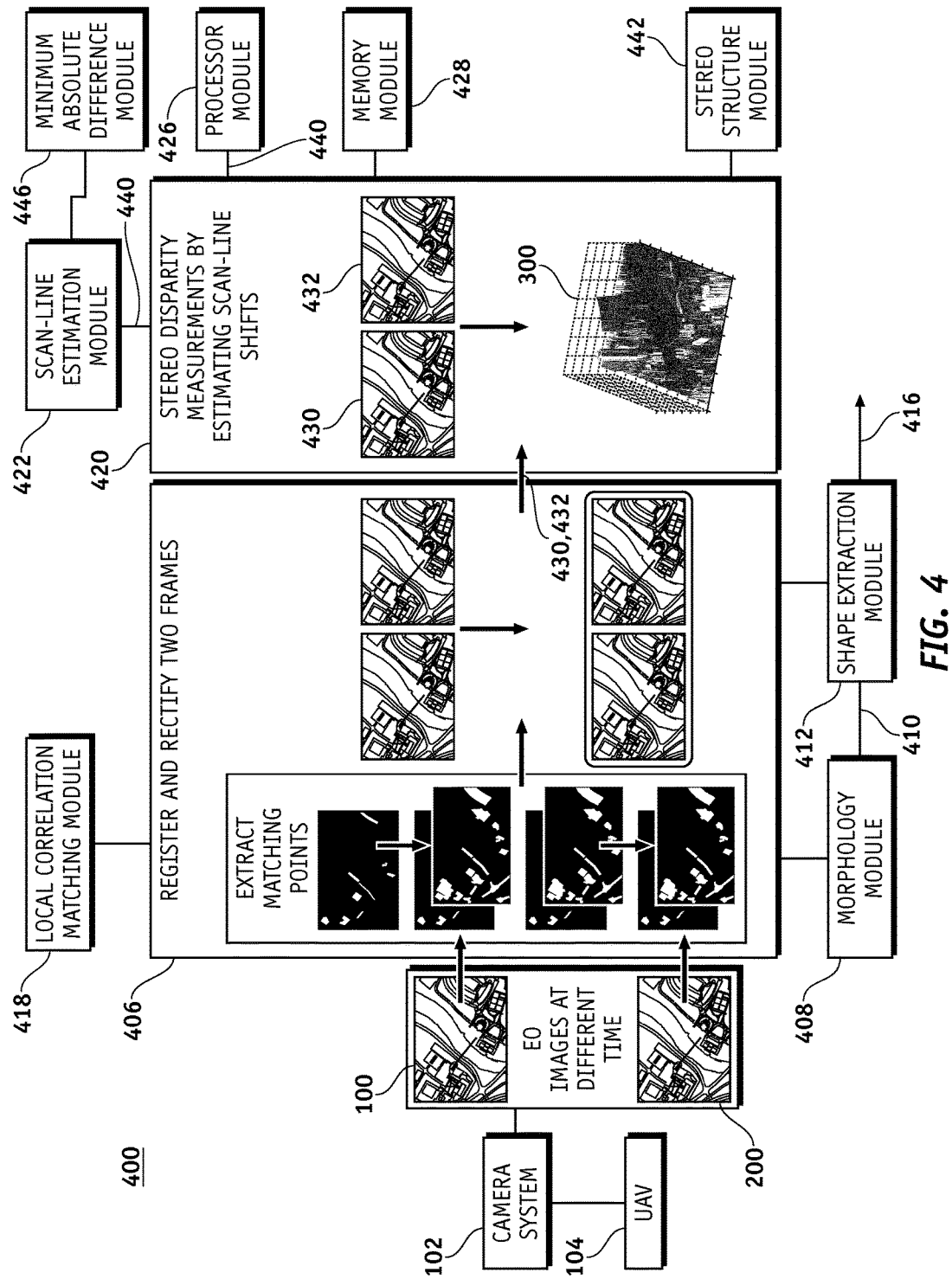
FIG. 4 is an illustration of a schematic functional block diagram of a system for generating stereo structure from FMV EO images according to an embodiment of the disclosure.

FIG. 4 is an illustration of a schematic functional block diagram of the system 400 for generating stereo structure from FMV EO images according to an embodiment of the disclosure. The system 400 generates the stereo structure 300 from the two input FMV EO images 100, 200 taken by the camera system 102 at different times loaded on a fast moving UAV 104. System 400 generates the Structure From Motion (SFM) for the FMV EO images 100 and 200.

The system 400 may comprise: a registration and rectification module 406, a stereo disparity module 420, a stereo structure module 442, a processor module 426, and a memory module 428. Part or all of system 400 may be located distant from UAV 104, and processing of stored or transmitted images captured by the camera system 102 may occur at a later time. Suitable transmission, reception, storage, and retrieval of image, signal, and time stamp data are well known.

The registration and rectification module 406 is configured to rectify the two input images 100 and 200 by matching points between the two FMV EO images 100 and 200. The registration and rectification module 406 comprises a 2-D morphology module 408, a 2-D shape extraction module 412, and a local correlation matching module 418.

To register and rectify the two input FMV EO images 100 and 200, the matching points are first determined from both of two input FMV EO images 100 and 200, and then registration and rectification (via registration and rectification module 406) is performed. The 2-D morphology module 408 extracts 2-D object shape morphology 410 from the FMV EO images 100 and 200.

The system 400 determines a location of meaningful shapes in the two data source FMV EO images 100 and 200. A shape may comprise, for example but without limitation, a geometrical description of a space or area occupied by an object as determined by an external boundary of the object. Building roofs are generally ideal since they generally have a uniform color and height. Also, roof tops tend to denote well a location of building corners. To maintain a proper generic framework, the 2-D morphology module 408 will frequently refer to roof candidates simply as shapes since any object with consistent height and color may be a good object to use for matching. So, for the FMV EO images 100 and 200, the 2-D morphology module 408 looks for patches of uniform color.

The morphology module 408 extracts the matching points between the two input FMV EO images 100 and 200. Different morphology processes such as, but without limitation, an Extended Maxima Transform (EMT) and an Edge Segmentation and Boundary Fill (ESBF) may be used.

As shown in FIG. 4, there are several shape images per input source FMV EO images 100 and 200. This is because the 2-D morphology module 408 uses more than one method to find places of uniform color. The 2-D morphology module 408 uses two methods discussed later, but the 2-D morphology module 408 can use a variety of image segmentation and shape finding methods either individually or at the same time during this step.

Once the 2-D morphology module 408 has found shapes in each of the FMV EO images 100 and 200 respectively, they are then labeled. So, the 2-D object shape morphology 410 is extracted from the 2-D morphology module 408. The 2-D object shape morphology 410 comprises a set of labeled shapes of possible roof tops in both the FMV EO images 100 and 200. These labeled shapes can then be passed on to the 2-D shape extraction module 412.

The 2-D shape extraction module 412 extracts 2-D shape properties 416 from the 2-D object shape morphology 410, and characterizes the labeled shapes. The 2-D shape extraction module 412 is configured to determine:

(1) Location of corners—the 2-D shape extraction module 412 uses these to create the matched points between the two FMV EO images 100 and 200.

(2) Shape descriptions—the 2-D shape extraction module 412 matches roof tops between the 2 FMV EO images 100 and 200 since this allows corner matching.

Item (1) has been discussed previously. Finding corners for each shape can be done by looking for extrema points in a shape. An equally important part is (2). The 2-D shape extraction module 412 determines which roof top shape extracted from the EO 2-D image 100 matches to the other EO image 200 in order to generate stereo disparity measurements. This may be made difficult since the roof tops in the FMV EO image 100 may not be at a same scale or rotation as in the other FMV EO image 200.

In order to generate the stereo disparity measurements from the FMV EO image pair 100, 200, the two FMV EO images 100, 200 are rectified using the matching points from the morphology module 408. A sub-pixel matching method is used to register two FMV EO images 100 and 200, and produce registration results. Transformation coefficients are determined according to the registration results by using a least-square estimation method, and images are wrapped so that image rows are parallel to a baseline.

The 2-D shape extraction module 412 is configured to extract shape properties from the 2-D object shape morphology 410. Once both the morphological methods EMT and ESBF are done, the shapes (roofs) are extracted. In order to match the shapes between the FMV EO images 100, 200, the shape properties are extracted to provide extracted shapes (roofs). Shape extraction is explained in more detail in the context of discussion of FIG. 5 below.

Once the morphology module 408 determines the matching shapes between two EO image pair 100, 200, they can be further registered and rectified. One EO image from the EO image pair is used as a base (reference) image (e.g., 802 in FIG. 8), and the other one as a search image (e.g., 804 in FIG. 8).

The local correlation matching module 418 performs EO image registration by using a Tie-Point method. Most of the traditional registration methods use a template correlation method. However, the template correlation method can be extremely slow given a large EO image size (>=4000× 2000), even with the state-of-the-art methods such as the Lukas-Kanade algorithm. To address this problem, the local correlation matching module 418 performs a local correlation as explained in more detail in the context of FIG. 8 below. In this manner, the local correlation matching module 418 brings location error within a single pixel by using the matching points (tie-point) obtained from last step.

The stereo disparity module 420 is configured to measure disparity by estimating scan line shifts. The stereo disparity module 420 comprises a scan-line estimation module 422 (scan-line module) and a minimum absolute difference module 446. Once the rectified EO image pairs 430 and 432 are generated by the registration and rectification module 406, a scan-line estimation method is applied by the scan-line estimation module 422 to match the pixels along the picked scan-line between the rectified EO image pair 430 and 432. The scan-line shift which gives the best match among all the scan-line shifts is selected as the desired stereo disparity of this pixel. The scan-line shift method of the scan-line estimation module 422 and a minimum absolute difference module 446 are explained in more detail in the context of discussion of FIG. 9 below.

Since the FMV EO imageries are much noisier than the ground stereo camera images, a single pixel comparison method does not work for FMV imagery. Instead, a Minimum Absolute Difference (MAD) approach that compares multiple pixels to search for a good match for each pixel along the scan-line is used in the system 400. The MAD approach is generally much more robust to noisy FMV EO imageries.

The stereo structure module 442 is configured to generate a stereo structure 300 from the first image frame and the second image frame. The first image frame and the second image frame comprise frames from the FMV.

The processor module 426 comprises processing logic that is configured to carry out the functions, techniques, and processing tasks associated with the operation of the system 400. In particular, the processing logic is configured to support the system 400 described herein. For example, the processor module 426 directs the system 400 to determine a set of matched corners from the two FMV EO images 100 and 200.

The processor module 426 also accesses data stored in the memory module 428 to support functions of the system 400. The data may comprise, for example but without limitation, correlation coefficients, coordinates of a roof top, camera drone location, virtual camera vector extrapolation information, 3-D polygon positions, image texture data, texture metadata, terrain representations (e.g., buildings, trees, ground, map), and other data.

The processor module 426 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 428 may be a data storage area with memory formatted to support the operation of the system 400. The memory module 428 is configured to store, maintain, and provide data as needed to support the functionality of the system 400 in the manner described herein. In practical embodiments, the memory module 428 may comprise, for example but without limitation, a non-volatile storage device (non-volatile semiconductor memory, hard disk device, optical disk device, and the like), a random access storage device (e.g., static random access memory (SRAM), dynamic random access memory (DRAM)), or any other form of storage medium known in the art.

The memory module 428 may be coupled to the processor module 426 and configured to store, for example but without limitation, a database, and the like. Additionally, the memory module 428 may represent a dynamically updating database containing a table for updating the database, and the like. The memory module 428 may also store, a computer program that is executed by the processor module 426, an operating system, an application program, tentative data used in executing a program, and the like.

The memory module 428 may be coupled to the processor module 426 such that the processor module 426 can read information from and write information to the memory module 428. As an example, the processor module 426 and memory module 428 may reside in respective application specific integrated circuits (ASICs). The memory module 428 may also be integrated into the processor module 308. In an embodiment, the memory module 428 may comprise a cache memory for storing temporary variables or other intermediate information during execution of instructions to be executed by the processor module 426.

The system 400 may comprise, for example but without limitation, a desktop, a laptop or notebook computer, a hand-held computing device such as a personal digital assistant (PDA), cellular phone, palmtop computer, etc. Furthermore, the system 400 may comprise a mainframe, a server, a client, or any other type of special or general purpose computing device as may be desirable or appropriate for a given application or environment.

The various illustrative blocks, modules, processing logic, and circuits described in connection with the system 400 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated system 400 depicts a simple embodiment for ease of description. These and other elements of the system 400 are interconnected together, allowing communication between the various elements of the system 400. In one embodiment, these and other elements of the system 400 may be interconnected together via a data communication bus 440.

Figure 5:
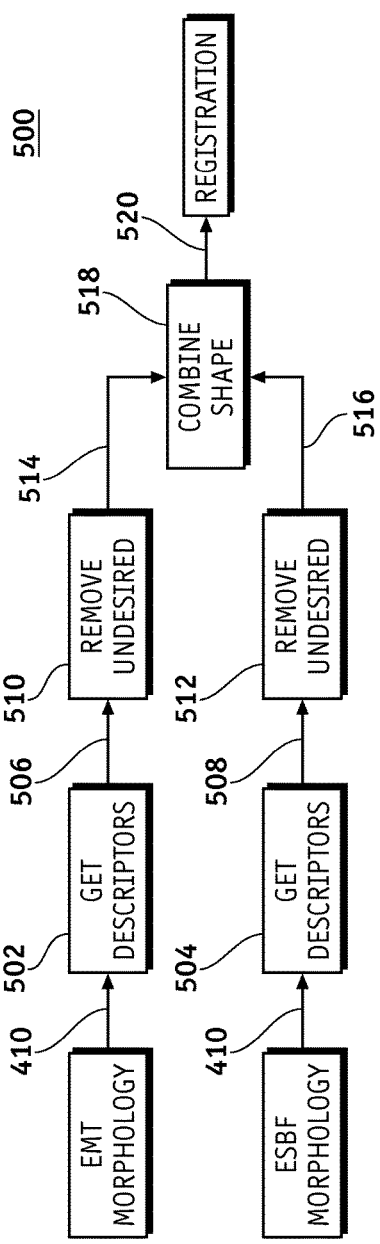
FIG. 5 is an illustration of an exemplary flowchart showing a shape property extraction process according to an embodiment of the disclosure.
Figure 7:
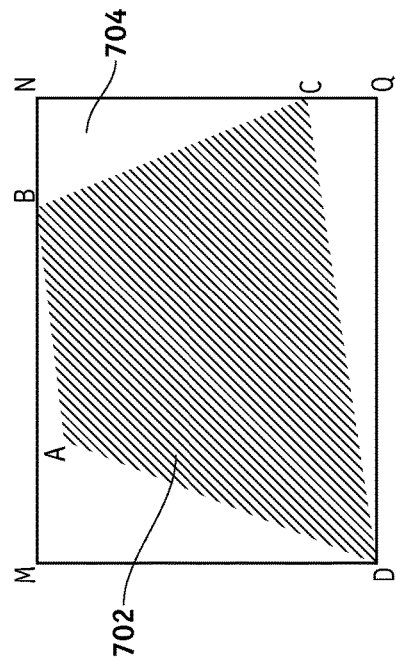
FIG. 7 is an illustration of an exemplary shape showing removing undesirable shapes according to an embodiment of the disclosure.
Figure 6:
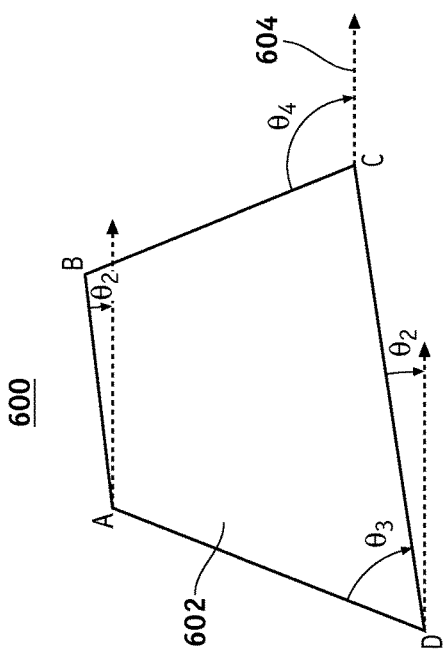
FIG. 6 is an illustration of an exemplary shape showing shape properties according to an embodiment of the disclosure.

FIG. 5 is an illustration of an exemplary flowchart showing a shape property extraction process 500 according to an embodiment of the disclosure. FIG. 6 is an illustration of an exemplary shape (roof top) 600 showing shape properties according to an embodiment of the disclosure. FIG. 7 is an illustration of an exemplary shape (roof top) 700 showing removing undesirable shapes according to an embodiment of the disclosure.

Process 500 uses 2-D object shape morphology 410 from both of the EMT and ESBF morphology methods of the morphology module 408 and outputs shape descriptors 506, 508 (tasks 502, 504). The shape descriptors 506, 508 may comprise properties providing descriptions of shapes. Different features are used to represent the shape descriptors as shown in FIG. 6. FIG. 6 illustrates how to calculate angles, height, width and size of a rectangular ABCD shape (roof) 602. Where points A, B, C and D are the four corners of the shape and $\theta 2$-$\theta 4$ are angles of the sides AB, DC and BC relative a reference line 604.

Process 500 then removes undesired shape regions of the shape descriptors 506, 508 to provide desired shape descriptors 514, 516 (tasks 510, 512). Process 500 removes the shapes according to an extent property as shown in FIG. 7. The extent property comprises area 702 divided by area 704. The physical meaning of the extent property is the ratio of the area 702 to that of the tightest rectangular bounding box shown by the area 704. If a value of the extent property is too small, a shape is more likely to be un-convex, and the shape is less likely to be a roof. Therefore, shapes whose extent property is smaller than a threshold (e.g., 0.35) are removed.

Process 500 then combines the desired shape descriptors 514, 516 together to provide a combined shape descriptor 520 (task 518). The combined shape descriptors 520 are then sorted in the memory module 428 from large to small, because shapes with a larger size are more likely to be shapes of a real roof.

Figure 8:
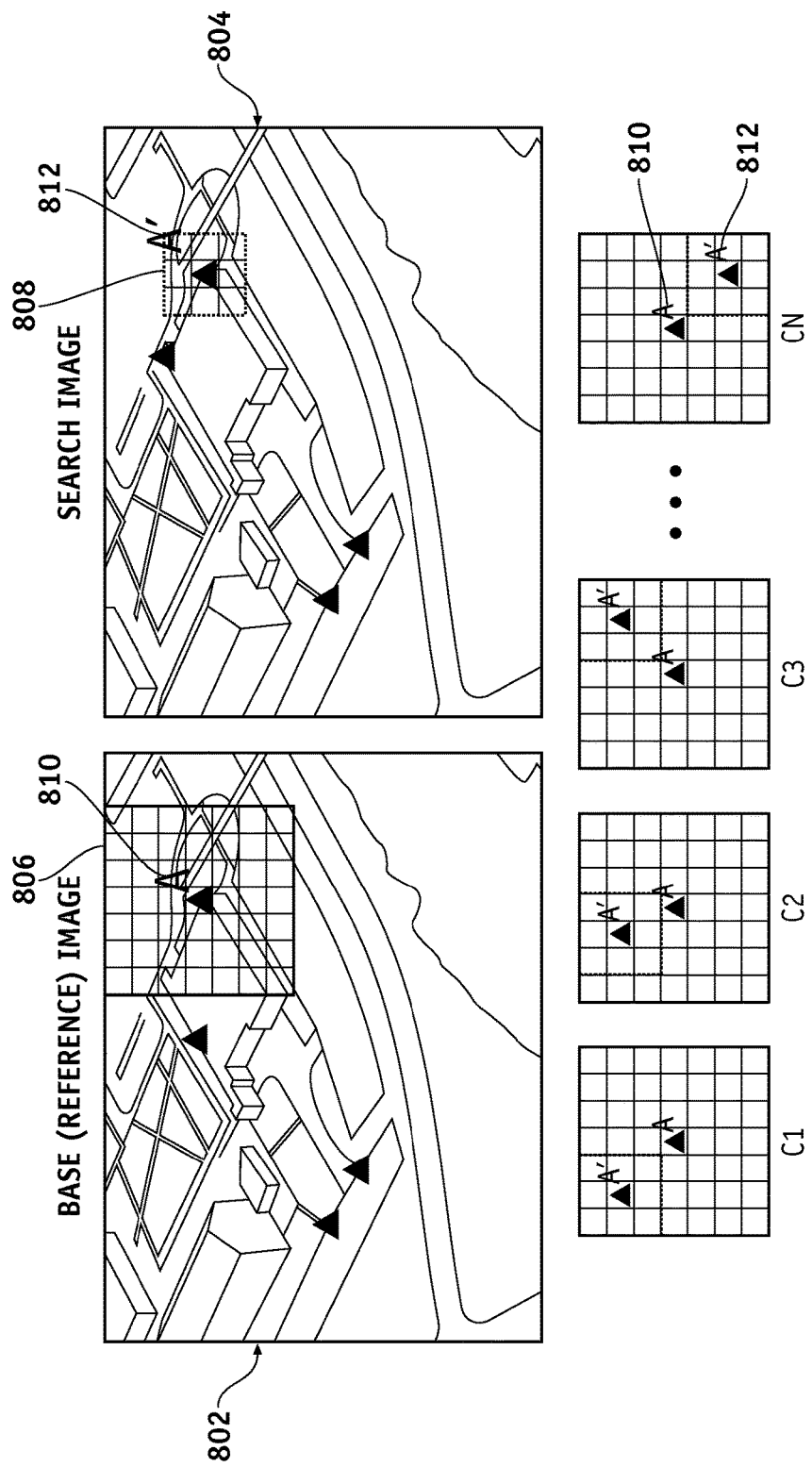
FIG. 8 is an illustration of a local correlation matching performed by a local correlation matching module according to an embodiment of the disclosure.

FIG. 8 is an illustration of a local correlation matching performed by the local correlation matching module 418 according to an embodiment of the disclosure. To register point A' 812 in a search image 804 with a point A 810 in a base image 802, a search area 806 is used as searching area. A template area 808 is used as a template. C1, C2 . . . Cn are correlation coefficients for each different sliding position.

For each matching points pair, the local correlation template match is applied. The search area 806 around one matching point A 810 (base point) from the base image 802, and the template area 808 around the other matching point A' 812 from the search image 804 are created. The local correlation method (e.g., of the local correlation matching module 418) is applied by sliding the template area 808 on the search area 806 pixel by pixel, and for each shift, determine one correlation coefficient value. A position with the highest correlation coefficient value is a final registration point.

For example, if C3 is the largest one among all the other correlation coefficient values, the corresponding position of A' 812 is the desired registration location of the original A 810 in the base image 802. If the largest correlation coefficient of one matched point pair is too low to be reliable, this matched point pair will be disregarded.

The local correlation method is a fast algorithm that can match the control point pairs to be within a few meters, no matter how large a distance of an image motion. This is because the system 400 needs to conduct a small local area correlation to bring the control point (tie point) pair matches to be within a single pixel. In this method, the size of the search area 806 is 39*39 pixels, and the size of the template area 808 is 25*25 pixels. The computation time is highly reduced by comparing with an original image size (e.g., about 4000×2000 pixels).

Figure 9:
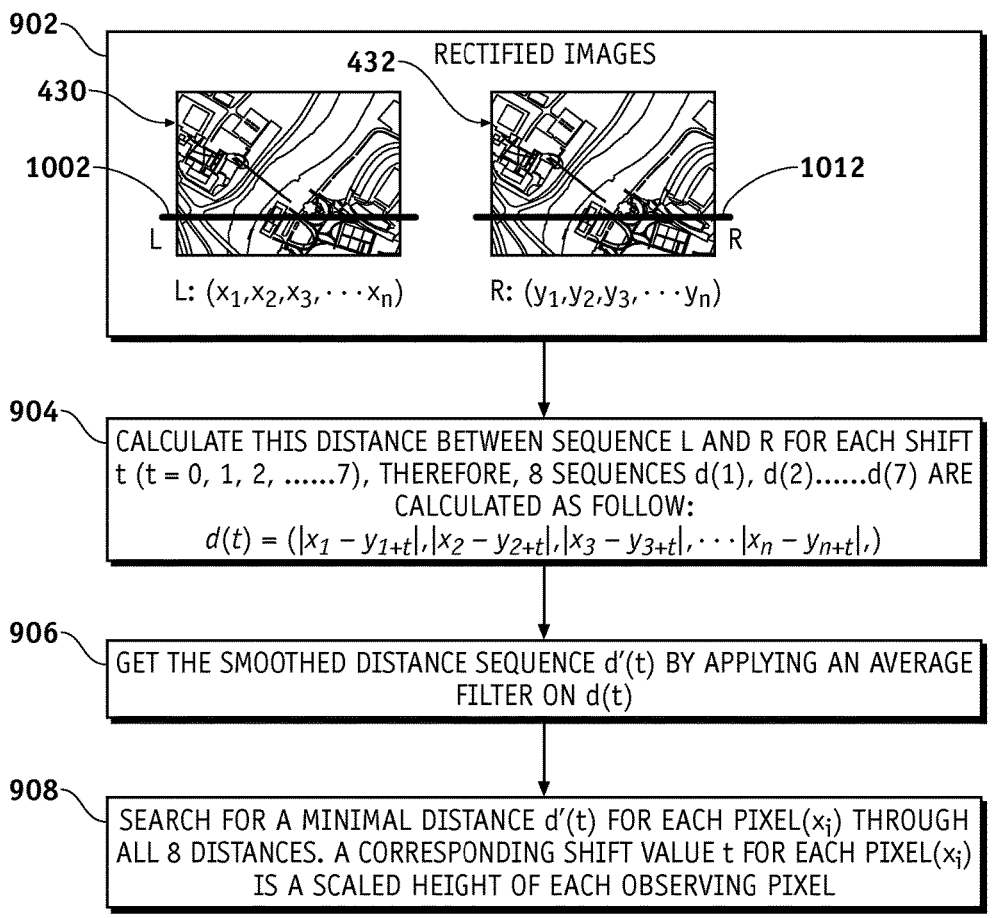
FIG. 9 is an illustration of an exemplary flowchart showing a scan-line shift process of a scan line estimation module according to an embodiment of disclosure.

FIG. 9 is illustration of an exemplary flowchart showing a scan-line shift process 900 of the scan-line estimation module 422 and the minimum absolute difference module 446 according to an embodiment of the disclosure. The scan-line estimation module 422 uses the following steps to extract stereo disparity from the rectified EO image pair 430, 432.

Process 900 may begin by the scan-line estimation module 422 selecting one row 1002 (scan line 1002) from one rectified EO image 430 (L image) and get a same row 1012 (scan line 1012) from the other rectified EO image 432 (R image) (task 902).

Figure 10:
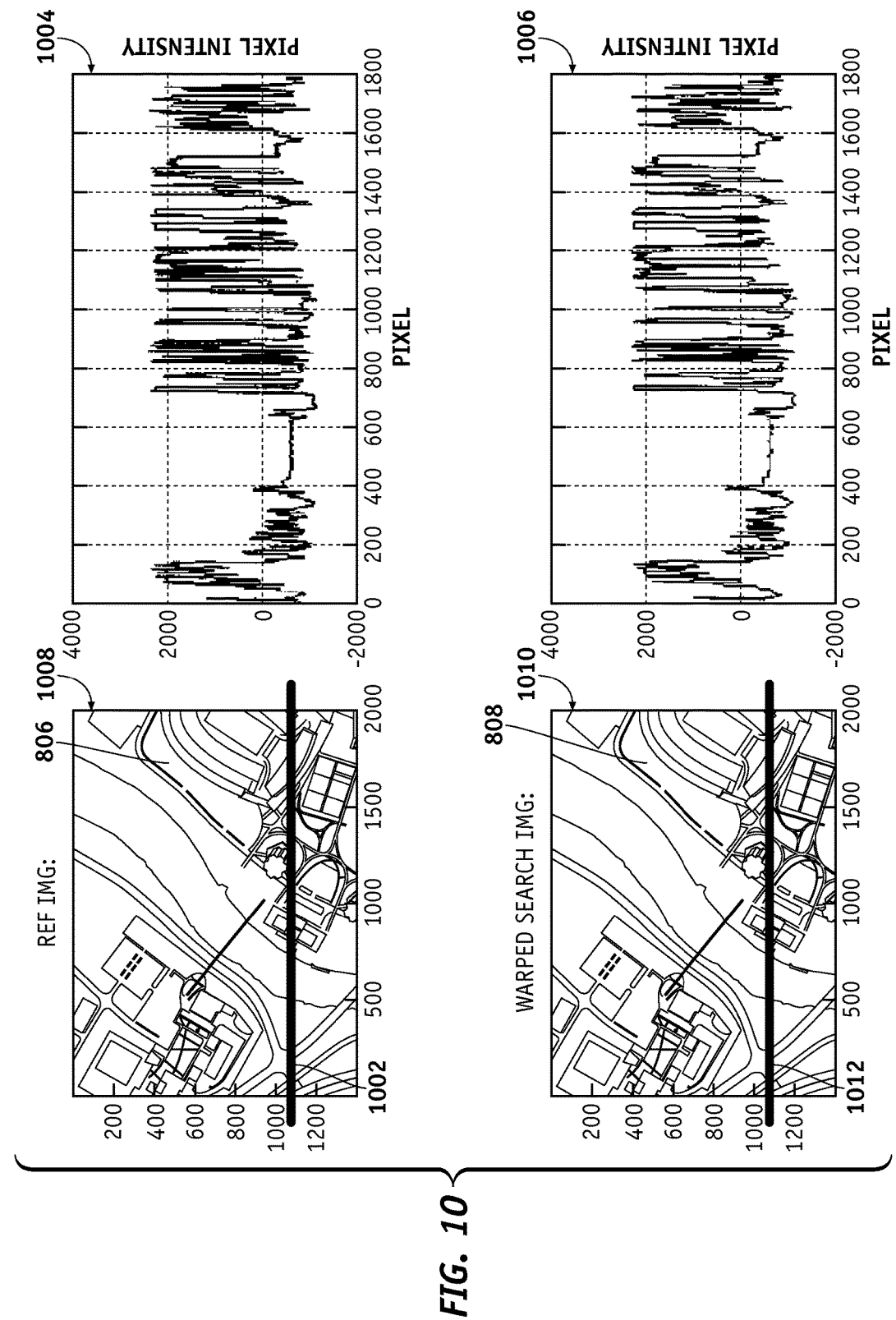
FIG. 10 is an illustration of exemplary plots showing pixel intensity vs. pixels for search area and template area respectively along scan lines according to an embodiment of the disclosure.

Process 900 may continue by the minimum absolute difference module 446 calculating a pixel value difference between pixel values along the scan lines from each rectified EO images 430 and 432 (task 904). The pixel values along the scan lines (row) from each rectified EO images 430 and 432 are shown in FIG. 10 (plots 1004 and 1006 respectively). A pixel value along the row 1002 (row i) in the L-image is L: $\{X_1, X_2, X_3 \ldots X_n\}$, and a pixel value along the same row 1012 in R-image is R: $\{Y_1, Y_2, Y_3 \ldots Y_n\}$.

$d(0)=\{|x_1-y_1|, |x_2-y_2|, |x_3-y_3|, \ldots |x_n-y_n|\}$, where, $d(0)$ is a distance sequence because there is no shift between sequence L and R. Then, the scan-line estimation module 422 iteratively right shifts sequence R one pixel, and calculate the pixel value difference by:

$d(t)=\{|x_1-y_{1+t}|, x_2-y_{2+t}|, |x_3-y_{3+t}|, \ldots |x_n-y_{n+t}|\}$, where, t is the shift value of sequence R, and, e.g., $0<=t<=7$.

Process 900 may then continue by the minimum absolute difference module 446 smoothing the sequences d(t), e.g., $0<=t<=7$, by the average filter (e.g., filter size may be about 15 on d(t)) (task 906).

Process 900 may then continue by the minimum absolute difference module 446 searching for a minimal distance d'(t) for each pixel $x_i$ and $y_i$ through all 8 distances (task 908). A corresponding shift value t for each pixel $x_i$ and $y_i$ is a scaled height of each observing pixel.

FIG. 10 shows illustrations of exemplary plots 1004, 1006, 1008 and 1010. The plots 1004 and 1006 show pixel intensity vs. pixel value for the search area 806 shown in the plot 1008 and the template area 808 shown in the plot 1010 respectively along the scan lines 1002 and 1012 respectively according to an embodiment of disclosure. For example, pixel intensity for pixels in the search area 806 are compared to pixel intensity for pixels in the template area 808 respectively along the scan lines 1002 and 1012 and calculated for 8 distances. A minimum difference (minimal distance) for each pixel through all 8 distances is a closest match. A corresponding shift value t for each pixel is a scaled height of each observing pixel.

Figure 11:
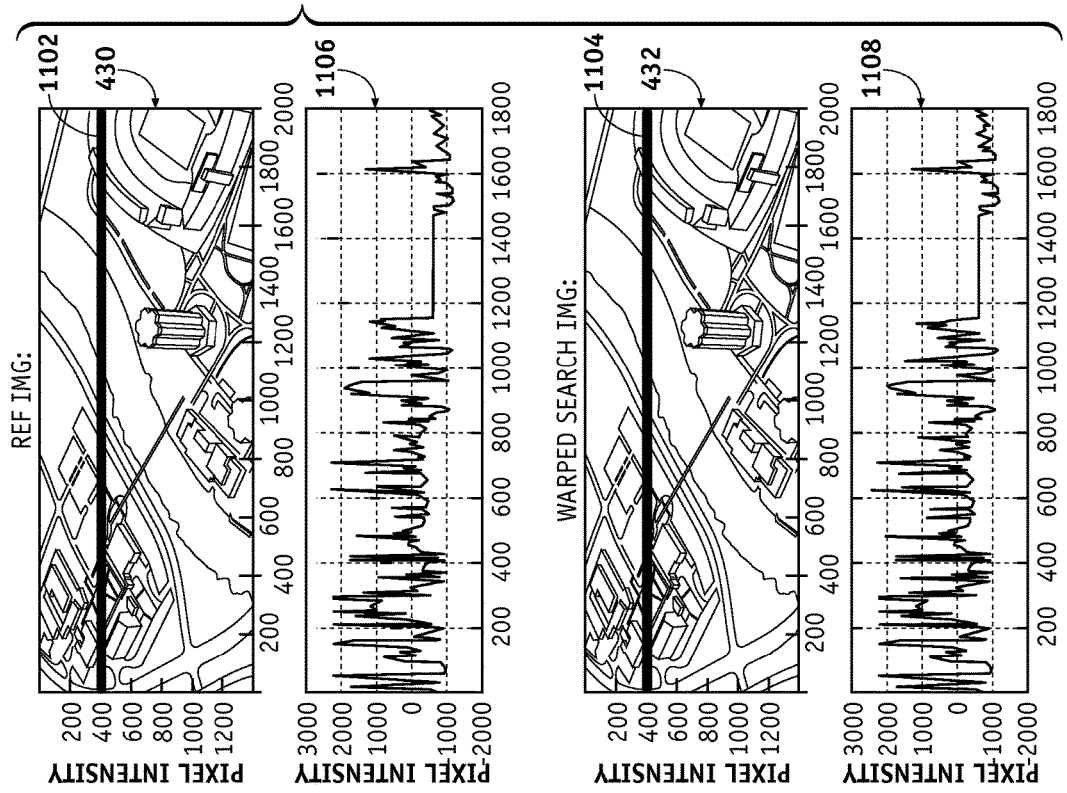
FIG. 11 is an illustration of exemplary plots showing pixel intensity vs. pixels of rectified FMV EO image pair respectively obtained by a register and rectify module showing an intensity of each pixel along respective scan lines according to an embodiment of the disclosure.

FIG. 11 are illustrations of exemplary plots 1106 and 1108 showing pixel intensity vs. pixels of the rectified FMV EO image pair 430, 432 respectively obtained by the register and rectify module 406 showing an intensity of each pixel along a scan line 1102 and 1104 respectively.

Figure 12:
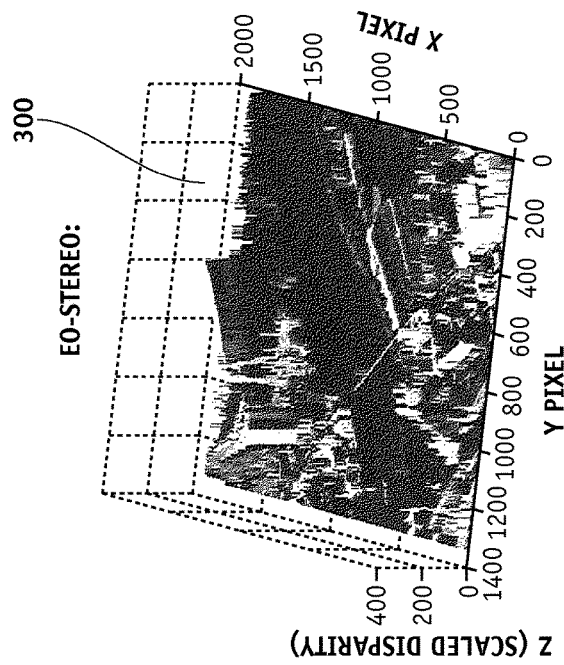
FIG. 12 is an illustration of scaled disparity vs. pixels of a stereo structure obtained from the rectified FMV EO image pair of FIG. 11 by using the scan-line shifts estimation module of the stereo disparity module according to an embodiment of the disclosure.

FIG. 12 is an illustration of scaled disparity vs. pixels of a stereo structure 300 obtained from the rectified FMV EO image pair 430, 432 of FIG. 11 by using the scan-line estimation module 422 of the stereo disparity module 420 according to an embodiment of the disclosure.

Figure 13:
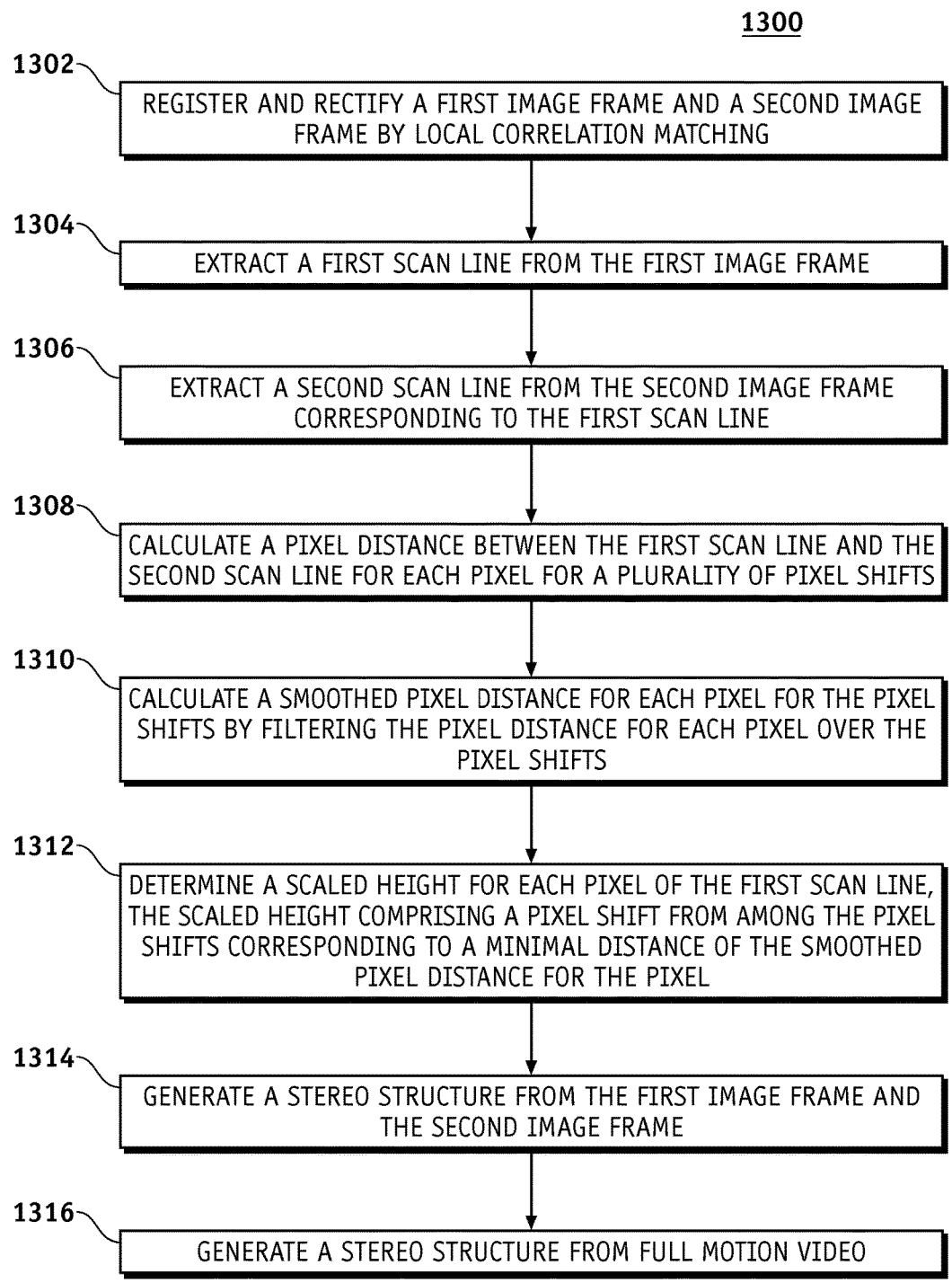
FIG. 13 is an illustration of an exemplary flowchart showing a process for generating stereo structure from FMV EO images according to an embodiment of the disclosure.

FIG. 13 is an illustration of and exemplary flowchart showing a process for generating a stereo structure according to an embodiment of the disclosure. The various tasks performed in connection with process 1300 may be performed mechanically, by software, hardware, firmware, a computer-readable medium having computer executable instructions for performing the process method, or any combination thereof. It should be appreciated that process 1300 may include any number of additional or alternative tasks, the tasks shown in FIG. 13 need not be performed in the illustrated order, and process 1300 may be incorporated into a more comprehensive procedure or process having additional functionality not described in detail herein.

For illustrative purposes, the following description of process 1300 may refer to elements mentioned above in connection with FIGS. 3-6. In some embodiments, portions of the process 1300 may be performed by different elements of the system 400 such as: the registration and rectification module 406, the scan-line estimation module 422, the minimum absolute difference module 446, etc. Process 1300 may have functions, material, and structures that are similar to the embodiments shown in FIGS. 1-11. Therefore common features, functions, and elements may not be redundantly described here.

Process 1300 may begin by registering and rectifying a first image frame and a second image frame by local correlation matching (task 1302).

Process 1300 may continue extracting a first scan line from the first image frame (task 1304).

Process 1300 may continue by extracting a second scan line from the second image frame corresponding to the first scan line (task 1306).

Process 1300 may continue by calculating a pixel distance between the first scan line and the second scan line for each pixel (in the first scan line and the second scan line) for a plurality of pixel shifts (task 1308).

Process 1300 may continue by calculating a smoothed pixel distance for each pixel for the pixel shifts by filtering the pixel distance for each pixel over the pixel shifts (task 1310).

Process 1300 may continue by determining a scaled height for each pixel of the first scan line, the scaled height comprising a pixel shift from among the pixel shifts corresponding to a minimal (minimum) distance of the smoothed pixel distance for the pixel (task 1312).

Process 1300 may continue by generating a stereo structure from the first image frame and the second image frame (task 1314).

Process 1300 may continue generating a stereo structure from full motion video (FMV) (task 1316).

In this way, a system and method is provided for 3-D structure information extraction from video for fusion with 3-dimensional point cloud images.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according to the embodiments of the disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 426, perform specified operations. Such instructions, generally referred to as "computer program code" or "program code" (which may be grouped in the form of computer programs or other groupings), when executed, enable a method of using the system 400.

The above description refers to elements or nodes or features being "connected" or "coupled" together. As used herein, unless expressly stated otherwise, "connected" should be interpreted to mean that one element/node/feature is directly joined to (or directly communicates with) another element/node/feature, and not necessarily mechanically. Likewise, unless expressly stated otherwise, "coupled" should be interpreted to mean that one element/node/feature is directly or indirectly joined to (or directly or indirectly communicates with) another element/node/feature, and not necessarily mechanically. Thus, although FIG. 4 depicts example arrangements of elements, additional intervening elements, devices, features, or components may be present in a configuration of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases shall not be read to mean that the narrower case is intended or required in instances where such broadening phrases may be absent.

The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method, comprising:
   generating a three-dimensional (3-D) stereo structure from a first image frame and a second image frame by at least:
   rectifying the first image frame and the second image frame by local correction matching, wherein the local correction matching comprises determining a plurality of correlation coefficient values between a first pixel selected from the first image frame and a plurality of second pixels selected within a template area of the second image frame, and wherein the template area is smaller than the second image frame;
extracting a first scan line from the first image frame, the first scan line comprising a first plurality of pixels;
extracting a second scan line from the second image frame corresponding to the first scan line, the second scan line comprising a second plurality of pixels;
calculating a first sequence of pixel distances between corresponding pixels in the first plurality of pixels and the second plurality of pixels;
shifting the second plurality of pixels by a shift value that is greater than zero;
calculating a second sequence of pixel distances between corresponding pixels in the first plurality of pixels and the shifted second plurality of pixels;
determining a minimal distance for a particular pixel of the first scan line from among at least the first sequence of pixel distances and the second sequence of pixel distances; and
determining a scaled height for the particular pixel of the first scan line, the scaled height comprising a pixel shift corresponding to the minimal distance for the particular pixel.

2. The method of claim 1, further comprising determining one or more shapes in each of the first image frame and the second image frame.

3. The method of claim 1, wherein the 3-D stereo structure is used to locate a position of an unmanned aerial vehicle.

4. The method of claim 1, wherein rectifying the first image frame and the second image frame comprises:
determining a first shape in the first image frame, wherein the first shape has a consistent color;
matching a second shape in the second image frame with the first shape; and
determining one or more matching points between the first shape and the second shape.

5. The method of claim 1, wherein the first image frame and the second image frame comprise frames from a full motion video.

6. The method of claim 5, further comprising generating a stereo structure from the full motion video.

7. A system, comprising:
a processor; and
data storage configured to store at least computer-readable instructions that, when executed by the processor, cause the system to perform functions, the functions comprising:
generating a three-dimensional (3-D) stereo structure from a first image frame and a second image frame by at least:
rectifying the first image frame and the second image frame by local correction matching, wherein the local correction matching comprises determining a plurality of correlation coefficient values between a first pixel selected from the first image frame and a plurality of second pixels selected within a template area of the second image frame, and wherein the template area is smaller than the second image frame;
extracting a first scan line from the first image frame, the first scan line comprising a first plurality of pixels;
extracting a second scan line from the second image frame corresponding to the first scan line, the second scan line comprising a second plurality of pixels;
calculating a first sequence of pixel distances between corresponding pixels in the first plurality of pixels and the second plurality of pixels;
shifting the second plurality of pixels by a shift value that is greater than zero;
calculating a second sequence of pixel distances between corresponding pixels in the first plurality of pixels and the shifted second plurality of pixels;
determining a minimal distance for a particular pixel of the first scan line from among at least the first sequence of pixel distances and the second sequence of pixel distances; and
determining a scaled height for the particular pixel of the first scan line, the scaled height comprising a pixel shift corresponding to the minimal distance for the particular pixel.

8. The system of claim 7, wherein the functions further comprise:
determining one or more shapes in each of the first image frame and the second image frame.

9. The system of claim 7, wherein the 3-D stereo structure is used to locate a position of an unmanned aerial vehicle.

10. The system of claim 7, wherein rectifying the first image frame and the second image frame comprises:
determining a first shape in the first image frame, wherein the first shape has a consistent color;
matching a second shape in the second image frame with the first shape; and
determining one or more matching points between the first shape and the second shape.

11. The system of claim 7, wherein the first image frame and the second image frame comprise frames from a full motion video.

12. The system of claim 11, wherein the functions further comprise:
generating a stereo structure from the full motion video.

13. The system of claim 12, wherein the stereo structure is used to locate a position of an unmanned aerial vehicle.

14. A non-transitory computer readable storage medium comprising computer-executable instructions that, when executed by a processor of a system, cause the system to perform functions comprising:
generating a three-dimensional (3-D) stereo structure from a first image frame and a second image frame by at least:
rectifying the first image frame and the second image frame by local correction matching, wherein the local correction matching comprises determining a plurality of correlation coefficient values between a first pixel selected from the first image frame and a plurality of second pixels selected within a template area of the second image frame, and wherein the template area is smaller than the second image frame;
extracting a first scan line from the first image frame, the first scan line comprising a first plurality of pixels;
extracting a second scan line from the second image frame corresponding to the first scan line, the second scan line comprising a second plurality of pixels;
calculating a first sequence of pixel distances between corresponding pixels in the first plurality of pixels and the second plurality of pixels;

shifting the second plurality of pixels by a shift value that is greater than zero;

calculating a second sequence of pixel distances between corresponding pixels in the first plurality of pixels and the shifted second plurality of pixels;

determining a minimal distance for a particular pixel of the first scan line from among at least the first sequence of pixel distances and the second sequence of pixel distances; and determining a scaled height for the particular pixel of the first scan line, the scaled height comprising a pixel shift corresponding to the minimal distance for the particular pixel.

15. The non-transitory computer readable storage medium of claim 14, the functions further comprising determining one or more shapes in each of the first image frame and the second image frame.

16. The non-transitory computer readable storage medium of claim 14, wherein the 3-D stereo structure is used to locate a position of an unmanned aerial vehicle.

17. The non-transitory computer readable storage medium of claim 14, wherein rectifying the first image frame and the second image frame comprises:

determining a first shape in the first image frame, wherein the first shape has a consistent color;

matching a second shape in the second image frame with the first shape; and determining one or more matching points between the first shape and the second shape.

18. The non-transitory computer readable storage medium of claim 14, wherein the first image frame and the second image frame comprise frames from a full motion video.

19. The non-transitory computer readable storage medium of claim 18, the functions further comprising generating a stereo structure from the full motion video.

20. The non-transitory computer readable storage medium of claim 19, wherein the stereo structure is used to locate a position of an unmanned aerial vehicle.

* * * * *